Feb. 11, 1930.       W. H. JORDAN       1,747,009
ORAL MIRROR APPLIANCE

Filed Aug. 8, 1927

INVENTOR
W. H. Jordan
BY
ATTORNEY

Patented Feb. 11, 1930

1,747,009

UNITED STATES PATENT OFFICE

WILLIAM H. JORDAN, OF KANSAS CITY, MISSOURI

ORAL MIRROR APPLIANCE

Application filed August 8, 1927. Serial No. 211,275.

The present invention relates to mirror appliances, and more particularly to devices of this character designed for use in dental operations, or other oral work of a surgical or like character, in connection with the mouth or other orifices of the body, where a reflecting instrument of this type is required.

Accordingly, the primary object of the invention is to provide a mirror instrument of a size adapted to be conveniently inserted and manipulated within the orifice where the work is being done, and having efficient means for illuminating the space and parts around the mirror element, by a novel arrangement of the illuminating means provided for this purpose.

In this connection it is also sought to provide a novel device of this character in which the illuminating means is operative not only to illuminate the space in front of the mirror but also the reflecting surface itself by rays emitted from the illuminating element directly to the reflecting surface.

The invention further comprises a device in which the lamp constituting the illuminating element is carried by a flexible supporting means, adapted to prolong the life of the lamp by thus absorbing the shocks to which it may be subjected.

With the foregoing general objects in view, the invention will now be described by reference to the accompanying drawing illustrating one form of construction which I have devised for embodying my improvement, after which the features and combinations deemed to be novel will be set forth in claims.

In the drawings:—

Figure 1:
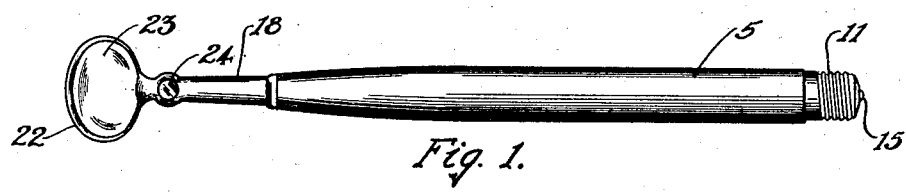
Figure 1 is a plan view illustrating a mirror instrument constructed in accordance with my invention.

Referring now to the drawing in detail, this illustrates my improved device as comprising a handle member 5, preferably of nonconductive material such as bakelite, formed with a central passage or bore 6 within which is carried a central flexible core for providing the electrical connections to an electrical lamp bulb 7 of suitably small size, having its plug 8 adapted to be screw-fitted into a threaded socket 9 in one end of the bronze sleeve or tube 10 forming the outer shell of the core above referred to. The other end of this core 10 is connected, as by soldering or the like, to the threaded shell 11 at the other end or head of the handle 5 to make electrical connection with any available light socket, the circuit through the lamp being completed by means of a wire 12 extending centrally through said core to the plug 8 and insulated from the sleeve 10 by a tube 14 of suitable insulating material, and having the outer end of the wire 12 provided with a suitable contact knob 15. The core structure just described is sufficiently smaller than the bore 6 to have slight play therein due to the obviously flexible character of the core elements, the combined structure being anchored at the head of the handle by means of a short packing sleeve 16 of insulating material, as clearly shown in Figure 2.

Figure 2:
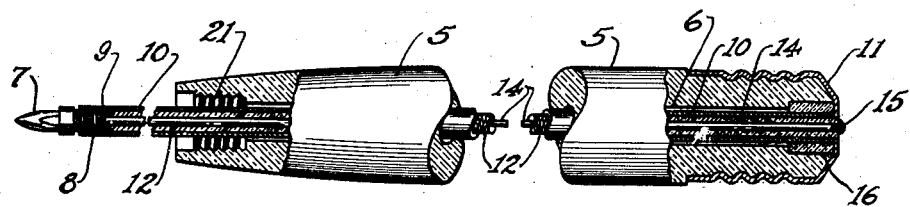
Figure 2 is an enlarged sectonal detail view of the handle portion of the device, with a portion thereof broken away.

The core structure projects sufficiently from the bore or passage 6 for locating the lamp element 7 within a lamp chamber 17 formed within the shank portion 18 of the handle, which shank is adapted to be detachably connected with the handle portion 5 by means of the thread 20 designed to fit a similarly threaded socket 21, (Figure 2). The shank 18 is formed with an angularly arranged mirror casing 22 within which is mounted a suitable mirror element 23, of any desired type, a slightly concave mirror being illustrated in Figure 3 of the drawing. In my improved construction, I provide a transparent window 24 at that side of the lamp compartment 17 which overlooks the space in front of the mirror 23, in order that the illumination from the lamp 7 will light up the space directly in front of the mirror.

Figure 4:
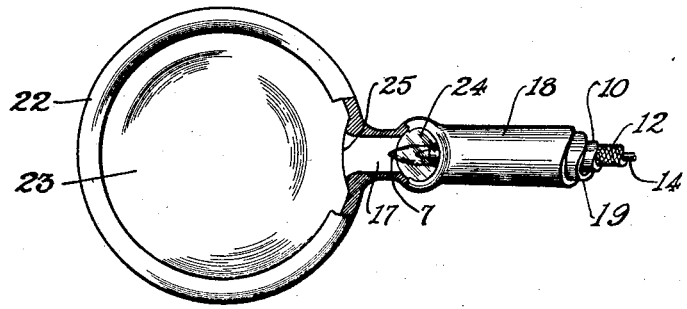
Figure 4 is a face view of the mirror element, and a portion of the shank, partly broken away, illustrating the lamp element and its connection in position.

In order to utilize all the rays from the lamp which may possibly be effective for illuminating purposes in work of the character for which the lamp is adapted, I provide a recess or concave portion 25 in that edge of the mirror which is exposed to the direct rays from the lamp 7 as shown in Figure 4, and this portion 25 of the mirror is left unsilvered, while the remainder of the mirror's edge is provided with a silvered reflecting surface as indicated at 26, being a continuation of the reflecting surface 23' at the back of the mirror 23. By means of this construction, the direct rays from the lamp 7 to which the transparent edge 25 is exposed are received and transmitted through the body of the mirror and reflected outward from its reflecting surfaces (23 and 26) into the space directly in front of the mirror, and thereby this additional light is also made available for illuminating the parts under the observation of the operator.

It is thus apparent that I have devised a practical and efficient device for carrying out the desired objects of the invention. In the form of mirror now commonly employed for work of this character, the illuminating element is so located as to emit direct rays falling upon the face of the mirror; therefore, some of these rays are reflected to the eye of the observer and others to the surrounding parts and these again reflected by the mirror to the eye. This results in more or less confusion and interference of the light rays, and hence a partial obscuring of the image due to high lights and shadows being produced. In the improved device, on the other hand, the direct light from the illuminating element is entirely excluded from the face of the mirror, and therefore none of the lamp's rays are reflected either to the eye or to the surrounding parts, and these are viewed in the mirror solely by the aid of light rays reflected from said parts themselves to the mirror and from it to the eye. Hence, the vision is not blurred on account of direct lamp rays reflected from the mirror to the eye, and the remaining illumination is so diffused as to produce clear vision without any annoying bright spots or shadows such as are usually produced by direct illumination.

Figure 3:
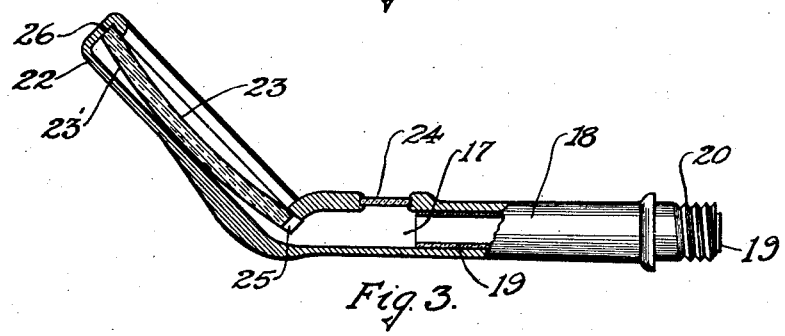
Figure 3 is an enlarged sectional view of the mirror element and the shank portion of the handle.

For guarding against any possibility of short-circuits of the tube 10 through the shank 18 I provide a sleeve 19 of bakelite or other suitable insulating material, forming a lining for the interior of said shank between the window 24 and the threaded end 20, and projecting slightly therefrom as indicated in Figure 3.

It will also be understood that the joint 20—21 between the handle and shank is watertight, so that the appliance may be thoroughly sterilized by being subjected to the usual boiling hot sterilizing bath.

The method of mounting the light bulb 7 renders it readily renewable, and moreover the life of the lamp is greatly prolonged due to its yielding supporting means as provided by the flexible character of the core structure 10 and the limited play allowed the same within the bore 6 of the handle. The device is of a neat, attractive and conveniently operated character, and of a highly efficient nature for the purpose for which it is intended.

While I have illustrated and described what I now regard as the preferred form of the embodiment of the invention, I desire to expressly reserve the right to make all such changes and modifications as may fairly fall within the scope of the appended claims.

Having thus described my invention, what I claim and desire to secure by Letters Patent is:

1. An oral mirror appliance for surgical use comprising a handle member and a mirror element held in fixed angular relation to one end of said handle, and a lamp enclosed within said end of the handle and the latter having a window opposite said lamp in position to illuminate the space in front of said mirror, the angularity of said mirror element being such as to exclude all direct rays passing from the lamp through said window from falling upon the face of the mirror.

2. An oral mirror appliance for surgical use comprising a handle member having a lamp chamber within one end thereof, a lamp mounted in said chamber, a mirror element held in fixed angular relation to said end of the handle and a window permitting illumination by the lamp of the space in front of said mirror while excluding all the lamp's direct rays therefrom, one of the edges of said mirror element being exposed to the direct rays from said lamp for illuminating the face of the mirror.

3. An instrument of the character described comprising a handle member having a lamp chamber within one end thereof, a lamp mounted in said chamber, and a mirror element of curved outline held in fixed angular relation to said end of the handle and having the edge surface of said mirror element silvered at all points except the area opposite said lamp and said area being transparent and exposed to the direct rays from said lamp for illuminating the face of the mirror.

4. An instrument of the character described comprising a handle member having a lamp chamber within one end thereof, a lamp mounted in said chamber, and a mirror element of curved outline held in fixed angular relation to said end of the handle and having a concave transparent edge portion across one side of said lamp chamber for exposing said edge to the direct rays from the lamp and thereby illuminating the face of the mirror, the silvered reflecting surface of the mirror being extended over the remainder of the edge portions thereof.

5. An oral mirror appliance for surgical use comprising a handle member having a lamp chamber within one end thereof, a lamp mounted in said chamber, and a mirror element held in fixed angular relation to said end of the handle and having one of the edges of said mirror element exposed to the direct rays from said lamp for illuminating the face of the mirror by transmission of said rays through said exposed edge, said chamber being provided with a window opposite said lamp in position to illuminate the space in front of the mirror while excluding from the face of the mirror all the direct rays passing from the lamp through said window.

6. An oral mirror appliance for surgical use comprising a handle provided with a detachable shank portion enclosing a lamp chamber, having a window, a mirror held in fixed angular relation to said shank portion, and a lamp provided with electric connections through said handle and projecting therefrom into said lamp chamber in position for illuminating the space in front of the mirror, the angularity of said mirror element being such as to exclude all direct rays passing from the lamp through said window from falling upon the face of the mirror.

7. An instrument of the character described comprising a handle provided with a detachable shank portion enclosing a lamp chamber, a mirror held in fixed angular relation to said shank portion, and a lamp provided with yieldingly supporting electrical connections extending through said handle and maintaining the lamp in projected relation inside said chamber in position for illuminating the space in front of the mirror.

8. An instrument of the character described comprising a tubular handle provided with a detachable shank portion enclosing a lamp chamber at one end of the handle, a mirror held in fixed angular relation to said shank portion, and an electric lamp within said chamber in position for illuminating the space in front of the mirror, and a flexible core carrying said lamp and having a slight flexing movement within the handle, said core projecting through the handle and secured to the opposite end of the latter.

In witness whereof I hereunto affix my signature:

WILLIAM H. JORDAN.